Feb. 6, 1968    K. BYSTRICKY ET AL    3,367,734
SUPPLEMENTARY OBJECTIVE WITH CONTINUOUSLY
VARIABLE MAGNIFICATION
Filed Feb. 13, 1964

United States Patent Office 3,367,734
Patented Feb. 6, 1968

3,367,734
SUPPLEMENTARY OBJECTIVE WITH CONTINUOUSLY VARIABLE MAGNIFICATION
Karl Bystricky, Wiener Neudorf, and Trude Muszumanski, Vienna, Austria, assignors to Karl Vockenhuber, and Raimund Hauser, both of Vienna, Austria
Filed Feb. 13, 1964, Ser. No. 344,576
Claims priority, application Austria, Feb. 22, 1963, A 1,392/63
1 Claim. (Cl. 350—184)

The invention relates to a supplementary objective with continuously variable magnification constructed in the manner of a Galilean telescope, the supplementary objective comprising a positive and a negative member having the same refraction power and located between a positive front member and a negative member of the Galilean system the last-mentioned negative member facing the following main objective.

In supplementary objectives of this kind the two members lying within, are moved at the same distance in opposite direction, when varying the focal length. By this fact however a strict constancy of the image position only results with the extreme settings, when the thin lenses 1 and 2 on the one hand and the lenses 3 and 4 on the other hand touch each other and when the thin lenses 2 and 3 touch each other. In the first case the total system forms a magnifying, in the second case it forms a reducing telescopic objective. In all other settings a more or less great deviation of the ideal image position has to be accepted.

It is an object of the present invention to avoid such deviations of the image position and to assure an image of sharp definition and high quality throughout the whole range of magnification.

With these and other objects in view, which will become apparent in the following detailed description, the present invention will be clearly understood in connection with the accompanying drawing in which.

The afocal supplementary objective according to the invention is constructed for 8 mm. substandard films, and together with a camera main objective having a focal length of 12.5 mm. and a relative aperture of the lens of 1:1.8 forms an objective of variable focal length having a range of the focal length of 9 to 18 mm. and a relative aperture of the lens of maximum 1:1.8.

The following data apply for the system as described in which $r$ represents the radii in millimeters, $d$ represents the thicknesses and air separations respectively, in millimeters, $n_d$ is the refractive index of the Helium yellow d-line and $v$ is the Abbé numbers, and

|     | | | |
| --- | --- | --- | --- |
| $L_1$ | $r_1=+70.12$ | $d_1=2.0$ | $n_d=1.623/v=58.1$ |
|  | $r_2=\infty$ | $d_2=0.6\text{-}16.9$ |  |
| $L_2$ | $r_3=\infty$ | $d_3=1.3$ | $n_d=1.623/v=47.0$ |
|  | $r_4=+28.23$ | $d_4=32.4\text{-}2.0$ |  |
| $L_3$ | $r_5=+28.23$ | $d_5=1.8$ | $n_d=1.623/v=58.1$ |
|  | $r_6=\infty$ | $d_6=0.5\text{-}14.6$ |  |
| $L_4$ | $r_7=\infty$ | $d_7=0.9$ | $n_d=1.623/v=47.0$ |
|  | $r_8=+46.86$ |  |  |

Magnification=1:2.

The supplementary objective is corrected with respect to the spherical aberration, the sine conditions, the astigmatism, the coma and the distortion, whereby also the chromatic aberrations are eliminated in a large extent. The relatively slight refraction powers of the members 1 to 4 permit the use of plano-convex lenses and plano-concave lenses respectively, whereby great tolerances are admissible for the thicknesses without introducing a change of the focal length. An essential advantage of the supplementary objective according to the invention is the low manufacturing expenditure which can be achieved firstly by the use of low-priced and easily workable glasses and further by the choice of plano-concave and plano-convex lenses respectively. The system furthermore distinguishes itself by a relatively great insensibility concerning the thicknesses and also the air separations of the lenses.

Figure 1:
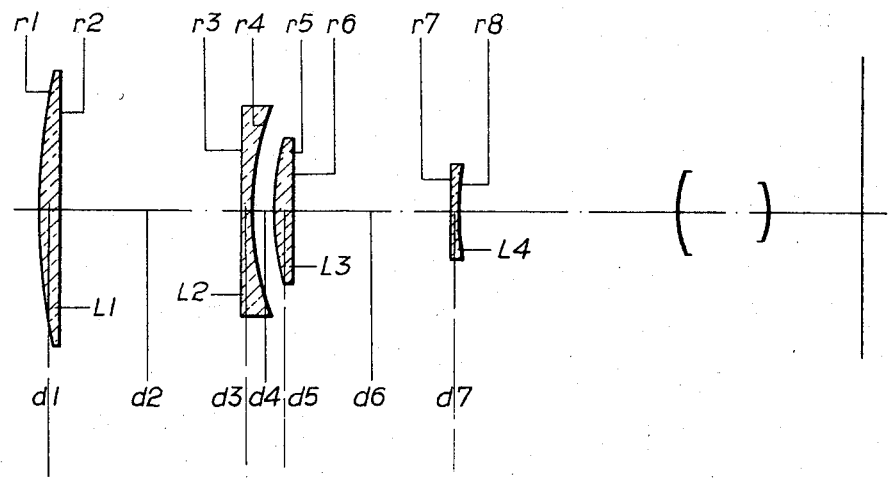
FIGURE 1 shows a sectional view of the objective.
Figure 2:
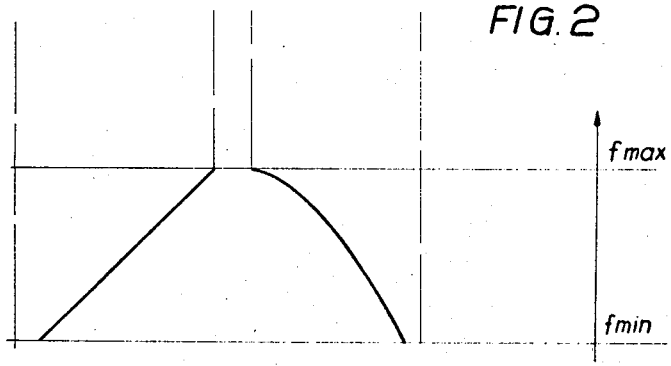
FIG. 2 represents graphically the movement of the objective members 2 and 3 of FIG. 1 upon the variation of the magnification of the total system.

The adjustment of the lenses $L_2$ and $L_3$ is effected according to the law of motion as represented in the diagram of FIG. 2. The movement of the lens $L_2$ is effected in a linear movement and the movement of the lens $L_3$ in movement of a higher power. In view of the relative high insensibility of the objective concerning the variations of the air separations, the control of the two objective members may be effected with tolerances.

While we have disclosed one embodiment of the present invention, it is to be understood that this embodiment is given by way of example only and not in a limiting sense, the scope of the present invention being determined by the objects and the claim.

What we claim is:

1. In a supplementary objective with continuously variable magnification constructed in the manner of a Galilean telescope, a positive front member and a negative rear member defining an optical axis, both members being stationary relative to each other and relative to a following main objective, a positive and a negative member having refraction powers of the same absolute value and being located on said optical axis and between said front and said rear member, said inner members being movable along said optical axis in opposite directions, and one of said inner members being movable linearly and the other of said inner members being movable non-linearly in such a manner that during variation of the magnification the image position remains constant, and supplementary objective complies substantially with the following table and beginning from the front end of the said supplementary objective $L_1$ to $L_4$ designate said lens members, $r_1$ to $r_8$ designate the radii of curvature of the lenses, the + values of the radii indicate the surfaces of the lenses being convex toward the front of said supplementary objective, $d_1$ to $d_7$ designate the axial thickness and the axial separations, the values of the radii and axial thickness and separations are given in terms of millimeters, $n_d$ are the refractive indices for the (Helium) d-line, $v$ are the Abbé's dispersion numbers:

| | | | |
|---|---|---|---|
| $L_1$ | $r_1 = +70.12$ | $d_1 = 2.0$ | $n_d = 1.623/v = 58.1$ |
| | $r_2 = \infty$ | $d_2 = 0.6$-$16.9$ | |
| $L_2$ | $r_3 = \infty$ | $d_3 = 1.3$ | $n_d = 1.623/v = 47.0$ |
| | $r_4 = +28.23$ | $d_4 = 32.4$-$2.0$ | |
| $L_3$ | $r_5 = +28.23$ | $d_5 = 1.8$ | $n_d = 1.623/v = 58.1$ |
| | $r_6 = \infty$ | $d_6 = 0.5$-$14.6$ | |
| $L_4$ | $r_7 = \infty$ | $d_7 = 0.9$ | $n_d = 1.623/v = 47.0$ |
| | $r_8 = +46.86$ | | |

Magnification = 1:2.

References Cited

UNITED STATES PATENTS 3,059,534   10/1962   Keznickl _____ 350—187

FOREIGN PATENTS 622,046   1/1938   Germany.

DAVID H. RUBIN, Primary Examiner.

JOHN K. CORBIN, JEWELL H. PEDERSEN,
Examiners.